United States Patent Office 3,574,557
Patented Apr. 13, 1971

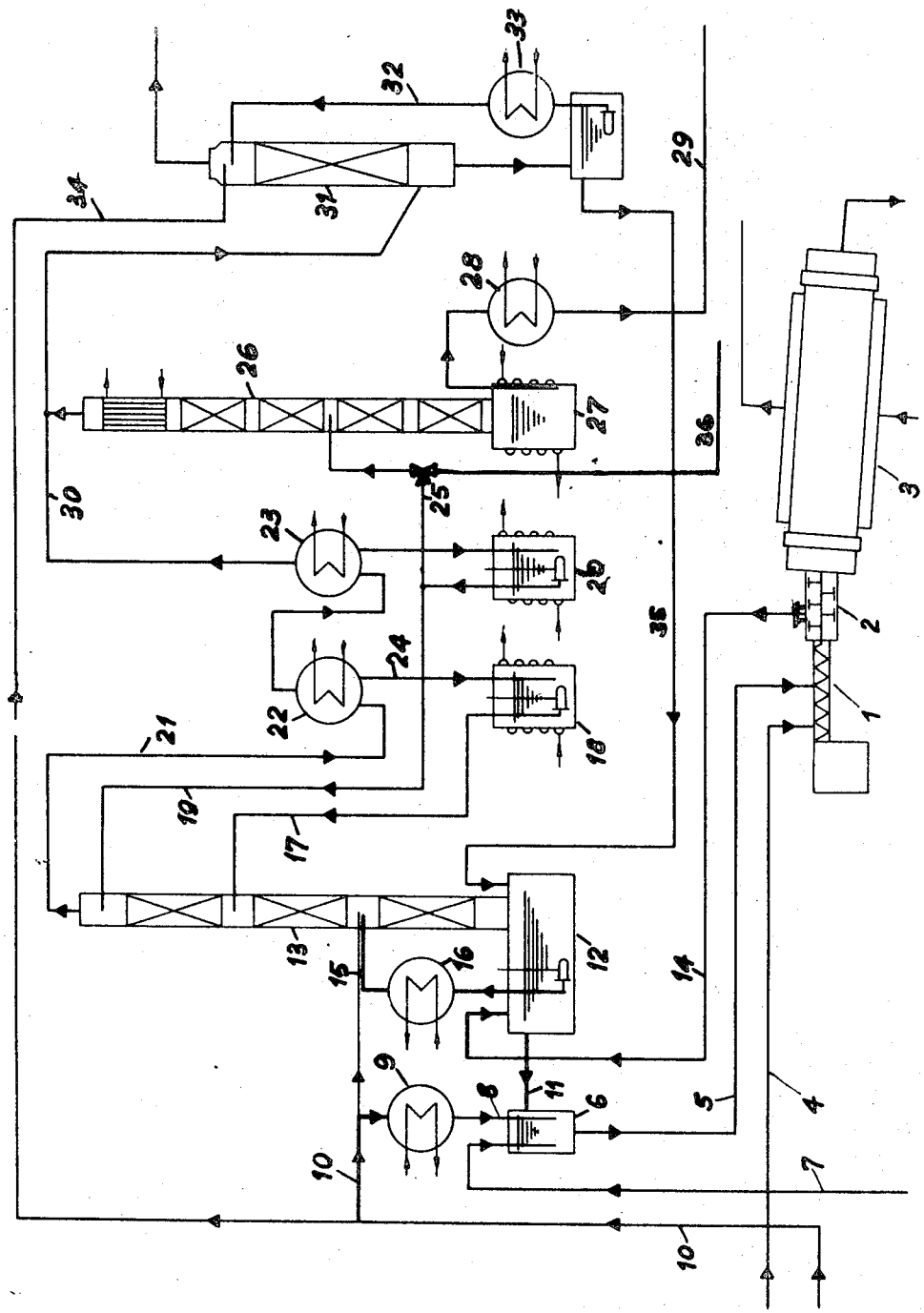

3,574,557
APPARATUS FOR THE CONTINUOUS PRODUCTION OF HYDROFLUORIC ACID
Renato Gentilli, Muttenz, Switzerland, assignor to Buss Aktiengesellschaft, Basel, Switzerland
Filed Feb. 26, 1968, Ser. No. 708,310
Claims priority, application Switzerland, Oct. 17, 1967, 14,581/67
Int. Cl. C01b 7/22
U.S. Cl. 23—263                                            3 Claims

ABSTRACT OF THE DISCLOSURE

Apparatus for the continuous production of hydrofluoric acid from fluorspar and sulphuric acid having means for mixing and kneading fluorspar with a hot premixture of hot washing acid returned from the hot gas scrubber, fresh pre-heated sulphuric acid and oleum, said kneading and mixing performed in a heated continuous kneader as first part of a three-stage reactor wherein the gas evolution-reaction commences in the first part and is to a major degree continued in a heated second part under agitation, the second part serving as degasifier for the reaction which is terminated in the final reactor where the mixture is heated to complete the conversion of anhydrite. The hot gases evolved in the first and third part of the reactor join the gases evolved in the second part of the reactor, functioning also as a dust catcher. The hot gases then go to a scrubbing and stripping column where recycled washing acid absorbs heat and impurities. The gases are stripped at the same time of hydrogen fluoride. The still hot gases are then lead to a scrubbing section employing first impure hydrofluoric acid and then pure hydrofluoric acid which absorb further impurities. Pure hydrogen fluoride is stripped. The residual warm gases go to a fractional condensation stage where substantial amounts of hydrofluoric acid of industrial purity are collected and volatile impurities with some hydrogen fluoride are bled off for conventional absorption with sulphuric acid and recycling. The technically pure hydrogen fluoride can be easily purified further by distillation under pressure to yield hydrofluoric acid of maximum purity.

---

The invention provides a process and an apparatus for the continuous production of hydrofluoric acid from fluorspar and sulphuric acid. The process comprises mixing fluorspar with a mixture of hot washing acid, fresh sulphuric acid and oleum in a reactor consisting of a heated kneader and mixer in which the reaction begins, continuing the reaction in the reactor functioning as a degasifier from which the reaction gases are directly withdrawn, and in completing the reaction in an adjoining final reactor into which the reacting materials are drawn. The apparatus for carrying out the process comprises a continuously working reactor consisting of a heated continuous mixer, a degasifier attached to said mixer and an adjoining final reactor, said mixer being provided with separate admissions for the introduction of fluorspar and of an acid mixture, whereas the degasifier communicates with the bottom of a scrubbing tower.

This invention relates to a process and an apparatus for the continuous production of hydrofluoric acid from fluorspar and sulphuric acid.

Conventional processes for the production of hydrofluoric acid by reacting $CaF_2$ with $H_2SO_4$ with the application of heat have various drawbacks. The reaction is performed in a rotating cylinder from which the gas is withdrawn. The reaction gases are highly contaminated by the after-reaction product and they also contain considerable volumes of dust. The gases must therefore be submitted to a complicated and expensive further treatment. Another drawback is that the mixer projects into the hot interior of the rotating cylinder.

It is the object of the present invention to avoid the above-mentioned drawbacks and to provide an efficient process for the continuous production of hydrofluoric acid from fluorspar and sulphuric acid, and apparatus for carrying out that process; which process comprises mixing fluorspar with a mixture of washing acid, sulphuric acid and oleum in a heated kneader and mixer in which the reaction begins, continuing the reaction in a reactor functioning as a degasifier from which the reaction gases are directly withdrawn, and in completing the reaction in a final reactor.

In this procedure the reaction gas does not come into contact, or comes only into transient contact with the dust of the after-reaction product and consequently it is far less contaminated. The greatly feared blockages and constrictions of the cross section of the pipe means do not occur. After the reaction in the degasifier it is desirable to wash the gaseous hydrofluoric acid that has evolved first with a cold washing acid, then with a cold raw hydrofluoric acid and finally with a cold pure hydrofluoric acid, and then to submit the hydrogen fluoride which contains only low boiling impurities to a two-stage condensation. Part of the cold pure hydrofluoric acid from the second condensation stage may be treated in a rectifying column for driving out the low boiling impurities, whereas another part of the cold pure hydrofluoric acid is recycled into the scrubbing tower to serve as a scrubbing agent. Conveniently the cold raw hydrofluoric acid from the first condensation stage may be recycled for scrubbing.

In the proposed three-part reactor the maximum possible evolution of gas begins directly after discharge of the reaction mixture into the degasifier from which the gases are withdrawn before they can enter the final reactor. At the same time hot gases from the final reactor flow in counter-current through the degasifier where they are responsible for generating the desired flow of gas. This process already causes some of the difficultly volatile components and dust to be separated in the degasifier. At the same time the reaction gases are cooled and enter the outlet pipes at a lower temperature. Also a premature partial condensation of the highly corrosive impurities is avoided.

The apparatus for performing the process according to the present invention comprises a continuously working reactor consisting of a heated continuous mixer, a degasifier attached to said mixer and an adjoining final reactor, said mixer being provided with separate admissions for the introduction of fluorspar and of an acid mixture, whereas the degasifier communicates with the bottom of a scrubbing tower.

Preferably the head of the scrubbing tower is connected to a two-stage condenser with separate receivers of which one is connected to the middle part of the scrubbing tower, whereas the other is connected both to the head of the scrubbing tower and to a rectifying column. Moreover, with advantage, the degasifier may have the form of a paddle mixer.

In order that the invention may be more readily understood, apparatus for performing the process according to the invention will be more particularly described with reference to the accompanying drawing which is a diagrammatic and illustrative lay-out of such apparatus for the continuous production of hydrofluoric acid.

Primarily the apparatus comprises a continuously working reactor which consists of a mixer 1, a degasifier 2 and a final reactor 3. The mixer has the form of a continuously working screw mixer which is provided with separate connections for the introduction of fluorspar and an acid mixture. The degasifier is coaxially attached to the screw mixer and has the form of a horizontal helical paddle mixer heated for instance with steam. Only part of its cross section is filled with the solid reaction material which thus leaves sufficient free space from which the reaction gases can be withdrawn. The helical paddle may be synchronously driven by the shaft of the screw mixer or it may be provided with independent drive means. The final reactor 3 which has the form of a rotating cylinder is connected to the discharge end of the degasifier 2 and is indirectly heated from the outside.

After having been ground and dried the fluorspar is fed into the mixer 1 through a pipe 4. A second pipe 5 connects the mixer 1 to a tank 6 in which the acid is mixed. A pipe 7 feeds oleum into the tank, whereas a second pipe 8 communicates through a heat exchanger 9 with a pipe 10 for the introduction of sulphuric acid. A connecting pipe 11 connects the acid mixing tank 6 to the bottom part 12 of a scrubbing tower 13.

In the mixer 1 the fluorspar is intimately and homogeneously contacted with a very hot acid mixture with which it chemically reacts. The mixture of acids is prepared in the acid mixing tank 6 and consists of very hot washing acid from the botom 12 of the scrubber 13 entering through the connecting pipe 11, of a preheated and concentrated sulphuric acid entering through the pipe 8 and of oleum which enters the acid mixing tank through the pipe 7. Some of the heat required for the following reaction of the fluorspar with the acid is obtained by heat exchange between the reaction gases and the washing acid. Further heat is generated by the immixture of the oleum and the sulphuric acid into the washing acid, by virtue of the remaining water in the washing acid and in the sulphuric acid being converted to sulphuric acid. This heat raises the temperature of the acid mixture in the tank 6.

As reaction proceeds large volumes of hydrogen fluoride are evolved in the degasifier 2, but sufficient space for the discharge of the gases is available. The speed of rotation of the mixer is so chosen that the maximum rate of evolution of gas will take place immediately after the mixture enters the degasifier 2 whence these gases are withdrawn through a pipe 14 before they can enter the final reactor 3. This pipe 14 communicates with the bottom part 12 of the scrubbing tower 13. At the same time hot reaction gases from the final reactor 3 flow in countercurrent through the degasifier 2. This already brings about the separation of some of the difficultly volatile constituents and of the dust which would otherwise be entrained by the reaction gases and cause undesirable blockages and constrictions in the pipes.

The final reactor 3 is indirectly heated from the outside and the reaction is completed therein, the final product of the reaction mixture being an anhydrite.

The still hot reaction gases are introduced into the bottom part 12 of the scrubbing tower 13, as already described. The cooling of the reaction gases and the removal therefrom of the high boiling and low boiling impurities then takes place. At the same time the exhaust gases are sufficiently purified to permit them to be discharged into the atmosphere. The hot reaction gases ascend the scrubbing tower 13 where they enter into mass and heat exchange with washing acids trickling down from above. Three different washing acids are used. A cold washing acid from conduit 35 is sprayed into the bottom part 12 of the scrubber 13. This is withdrawn from the bottom part 12 through a pipe 15 and conveyed through a heat exchanger 16, where it is cooled to about 40 to 50° C. Moreover, the cooled washing acid may be enriched by the admixture of cold concentrated sulphuric acid. The washing acid introduced into the bottom part of the scrubbing tower through a pipe 15 trickles into the hot rising reaction gases with a resultant intense direct heat exchange. The considerable temperature rise of the washing acid leads to HF being desored, whereas at the same time the high boiling impurities are scrubbed out of the rising reaction gases.

Through a further pipe 17 cold raw hydrofluoric acid is introduced into the scrubbing tower from a receiving tank 18 and the gases which are still hot are thus scrubbed again. The removal of high boiling impurities from the ascending gases is thus continued, and the temperature of the gases is further reduced. Finally, cold hydrofluoric acid which is taken from a receiving tank 20 and is already very pure is pumped into the head of the scrubber through a pipe 19. The gases leaving the scrubbing tower 13 overhead through a pipe 21 contain only the low boiling impurities. They are fractionatedly condensed in separate condensers 22 and 23. The first condenser 22 is cooled with cold water and the second with brine. The slightly less pure preliminary condensate from the condenser 22 is taken through a pipe 24 into a receiver 18, whereas highly pure hydrofluoric acid from the condenser 23 is collected from the condenser 23 in a receiver 20. The cold hydrofluoric acid from this receiver 20 is taken partly through the pipe 19 into the upper part of the scrubber 13, whereas the remainder enters a rectifying column 26 through a pipe 25. The rectifying column 26 is operated at a gauge pressure of between 1 and 10 ats. and serves for driving out the residual low boiling impurities. A hydrofluoric acid of maximum purity flows out of the bottom 27 of the rectifying column 26 and, after having been cooled in a heat exchange 28, it is pumped through a pipe 29 into the reservoirs. The exhaust gases from the condenser 23 and from the rectifying column 26 are conveyed in a main trunk 30 to the bottom of an absorption tower 31. The absorbent is washing acid conducted in countercurrent and taken from the bottom of the tower through a pipe 32. This acid is cooled in a heat exchanger 33.

Moreover, further fresh cold sulphuric acid is introduced through a pipe 34 and trickles down from the head of the absorption tower 31.

The small volume of residual gaseous impurities emerging from the head of the absorption tower 31 is then scrubbed in conventional manner with water before these gases are discharged, containing a little $SO_2$ and $CO_2$ in quantities within the permissible limits and hardly measurable traces of hydrogen fluoride.

For the purpose of illustrating the invention an example will be hereunder described.

EXAMPLE 1360 kg. per hour of a 97% pure fluorspar are introduced continously into the mixer 1, whereas in the acid mixing tank 6 a mixture is formed from hot recycled washing acid which enters continously and about 350 kg. per hour of a hot concentrated 98% sulphuric acid which is still further heated by an addition of 750 kg./h. of oleum. The acid mixture is sprayed into the mixer from the pipe 5. The reaction produces about 1050 kg./h. of reaction gases having an HF content slightly exceeding 80% and about 2300 kg./h. of anhydrite.

The gases leaving the scrubbing tower 13 already contain more than 90% HF after they have been scrubbed. After condensation the hydrofluoric acid collecting in the receiver 20 is of a purity exceeding 99.5%. This hydrofluoric acid can already be used as a hydrofluoric acid of industrial purity for a large number of purposes without further treatment and can be withdrawn from the receiver 20 through a pipe 36. The condensing process is so controlled that the residual gases containing low boiling impurities enter the absorption tower 31 at the rate of about 300 kg./h. containing about 80% HF. About 540 kg./h. of a cold 98% sulphuric acid are introduced into this tower. After absorption about 80 kg./h. of gases leave the absorption tower. Their HF content is reduced to less than 30% and the proportion of air is about 20%. From the absorption tower 31 about 760 kg./h. of washing acid return into the bottom 12 of the scrubber 13. The washing acid flowing through the pipe 35 contains about 30% HF, about 70% $H_2SO_4$ and 1 to 3% water as an impurity.

In the above example about 625 kg./h. of hydrofluoric acid are diverted into the rectifying column 26. From the bottom of this column about 613 kg./h. of hydrofluoric acid which is 99.9% pure are withdrawn, whereas about 12 kg./h. of gaseous impurities escape from the tower overhead.

While the process herein described, and the apparatus used for carrying out this process into effect constitute a preferred emobdiment of the invention, it is to be understood that the invention is not limited to this precise process and apparatus, and that changes may be made in either without departing from the scope of the invention which is defined in the appended claims.

What is claimed is:

1. Apparatus for the continuous production of hydrofluoric acid from fluorspar and sulphuric acid comprising:
    (a) a heated mixer comprising a chamber fitted with a continuously rotating screw;
    (b) feeding means for introducing fluorspar into the chamber of said mixer;
    (c) means for feeding sulphuric acid to said chamber;
    (d) a degasifier coaxial with said screw which is secured to said rotating screw, said degasifier including helical paddle mixing elements driven by said screw, a chamber, steam admitting means thereto and free head space in said degasifier chamber from which gases are withdrawn;
    (e) a reactor in the form of a rotating cylinder connected to the discharge end of said degasifier;
    (f) external heating means for said reactor;
    (g) a scrubbing tower connected at its bottom to said degasifier for absorbing hydrofluoric acid;
    (h) a withdrawal pipe connected to the degasifier and to the scrubbing tower for leading the gases exiting from the free head space of said degasifier into the bottom of said scrubbing tower;
    (i) means to feed cold washing acid to an upper part of said scrubbing tower to spray over the hot gases which ascend from the bottom; and
    (j) fractionating distilling means connected to and fed from said scrubbing tower for rectifying pure hydrofluoric acid from the impure acid recovered in said scrubbing tower.

2. Apparatus as claimed in claim 1, including a two-stage condenser connected to said scrubbing tower, said condenser having separate receivers and one of said receivers being connected to an intermediate point of the scrubbing tower while the other of said receivers is connected to the top of the scrubbing tower and to said fractionating distilling means.

3. Apparatus as claimed in claim 2, wherein a heat exchanger is provided to cool hot liquid acid recovered from the bottom of said scrubbing tower and a liquid acid withdrawal pipe is provided to remove the hot liquid acid from the scrubbing tower for cooling in said heat exchanger, said withdrawal pipe being also fed with cold liquid acid to aid in rapid cooling of said hot acid to a temperature below about 50° C.

References Cited

UNITED STATES PATENTS

| | | | |
|---|---|---|---|
| 2,047,210 | 7/1936 | Lawrence | 23—153 |
| 2,932,557 | 4/1960 | List et al. | 23—153 |

JAMES H. TAYMAN, JR., Primary Examiner

U.S. Cl. X.R.

23—153, 260; 55—71